INVENTOR
HARRY WILKIE

Dec. 12, 1950 H. WILKIE 2,533,256
NAVIGATIONAL DATA INTEGRATOR
Filed June 28, 1945 2 Sheets-Sheet 2

INVENTOR
HARRY WILKIE
By: William D. Hall
ATTORNEY.

Patented Dec. 12, 1950

2,533,256

UNITED STATES PATENT OFFICE 2,533,256

NAVIGATIONAL DATA INTEGRATOR

Harry Wilkie, Dayton, Ohio

Application June 28, 1945, Serial No. 602,137

9 Claims. (Cl. 235—61)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a navigational instrument and more particularly to such an apparatus for use in minimizing navigational computations.

It is an object of the present invention to provide a navigational instrument that, through its operation, avoids the necessity of involved mathematical computations.

Another object is to provide an improved instrument that indicates continuously the positions of a plane with respect to its places of departure and destination.

Figure 1:
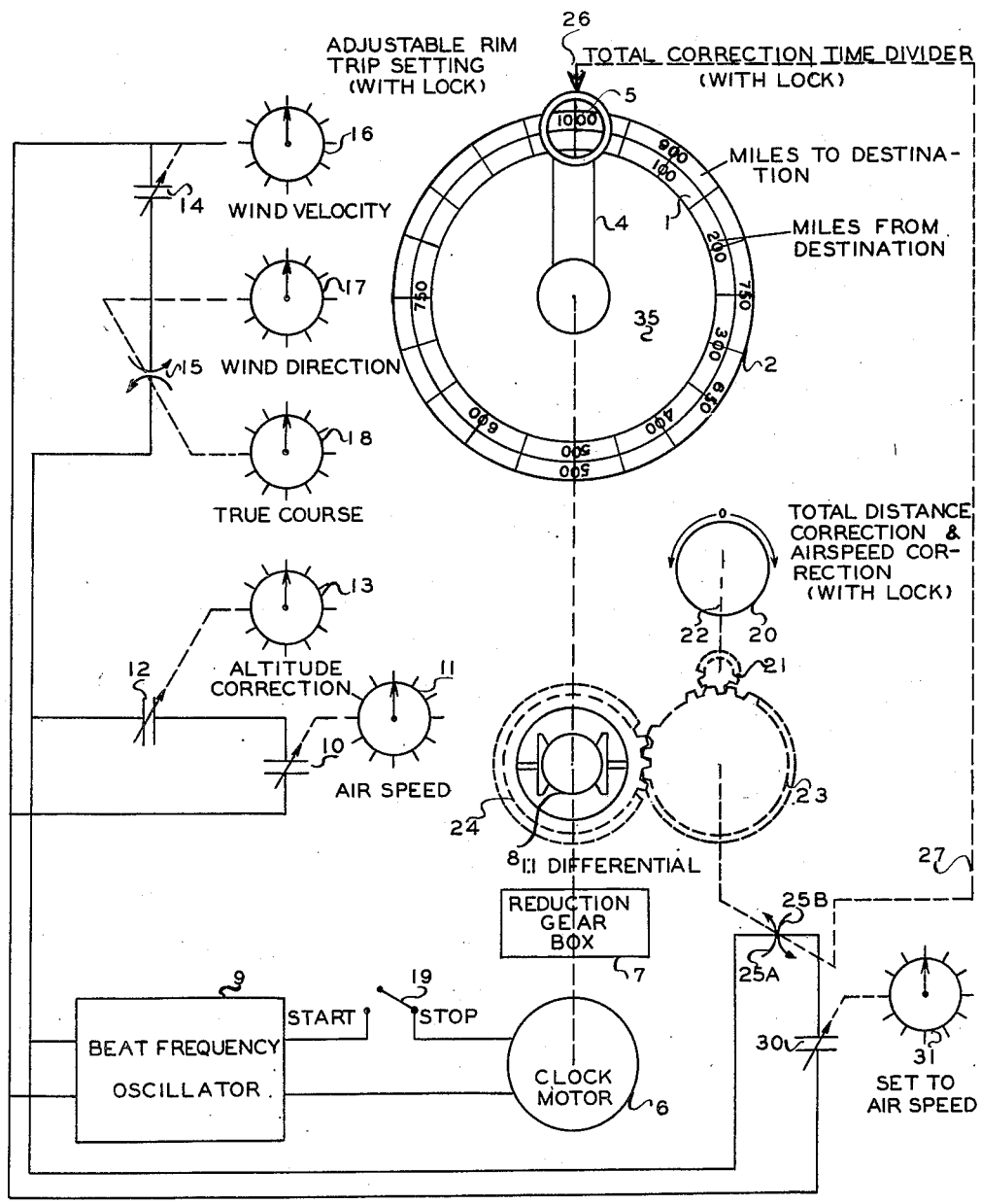
Figure 2:
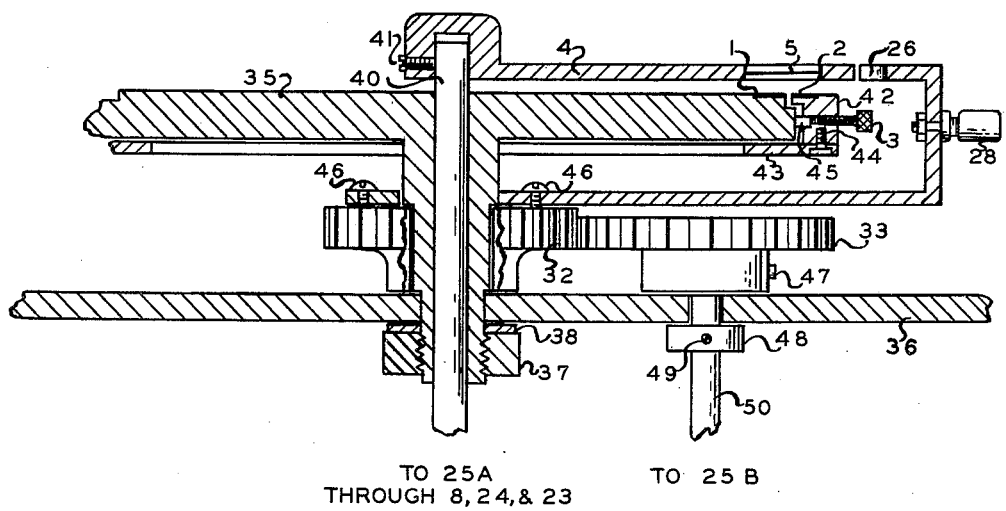

The above and other objects will be apparent to those who are informed in the subject of air navigation from the following description of an illustrative embodiment of the present invention that is shown in the accompanying drawings wherein:

Fig. 1 is a schematic circuit diagram and mechanical diagram of an instrument that serves as a navigation data integrator; and Fig. 2 is a cross sectional view of an illustrative mileage dial that is part of the instrument that is shown in Fig. 1.

The apparatus that is shown in Fig. 1 of the accompanying drawings provides for the disposition of a single distance indicating dial on the instrument panel of an aeroplane. The dial so disposed comprises preferably a pair of concentric circular scales near its periphery, one of the scales 1 being calibrated to indicate ground distance miles from place of departure and the other scale 2 being calibrated to indicate ground distance miles to destination. Preferably the outer scale 2 indicating miles to destination is rotatable by manual operation and is adapted to be preset to the estimated length of a proposed trip by rotating the scale 2 to bring the known mileage to a destination reading into alignment with the zero reading on the fixed scale 1, reading ground distance miles from departure, and then locking the outer scale 2 in this preset position by suitable means, such as by a trip setting thumb screw operated lock 3, as shown in Fig. 2, or the like.

The dial so provided has a radially extending ground mileage indicating index needle 4 that has its inner end journalled substantially at the common center of the two scales 1 and 2 and that is adapted at its outer end for sweeping along and for indicating readings upon the scales 1 and 2, as by means of a hair line 5 or the like, that extends longitudinally of the index needle 4 adjacent the outer end thereof.

The needle 4 is driven by suitable controllable means such as by a synchronous clock motor 6 or the like, as indicated by a broken line therebetween. The turning movement of the motor 6 is reduced through a reduction gear box 7 and the movement is continued through a preferably 1 to 1 differential 8 from which the needle 4 is driven to revolve slowly so that the hair line 5 thereon moves along the scales 1 and 2.

The rate of rotation of the rotor part of the motor 6 is controlled in any desired manner and preferably by being electrically driven by an electron tube beat frequency oscillator 9 or the like. With this provision the current that is integrated from the alternating current output of the electron tube beat frequency oscillator 9 drives the synchronous motor 6 and determines the rate of movement of the dial needle 4. The frequency of the oscillator 9 is controlled by the tuning of a desired plurality of adjustable condensers 10, 12, 14, 15, 25 and 30 that preferably are connected in the tank circuit of the oscillator 9 as shown. The adjustment of each of the condensers is controlled by any suitable type of dial that is calibrated in a preferred manner.

An air speed condenser 10 comprises a desired number of plates, at least one of which is adjustably movable by operation of a suitably calibrated knob 11 that is adapted for tuning the oscillator 9 by means of the condenser 10 in terms of air speed. The condenser 10 varies the frequency of the beat frequency oscillator 9 in proportion to the reading on the dial of the knob 11. The setting of the knob 11 to the air speed of an aeroplane causes the needle 4 to indicate on the scales 1 and 2 the miles from departure and the miles to destination as functions of the total elapsed time. The frequency of the oscillator 9 is adjusted such that the motor 6 operates at a controlled rate of speed and consequently regulates the rate of movement of the mileage dial needle 4.

An altitude correction of the air speed control so established is provided by means of an altitude correcting tunable condenser 12 that is tuned by operation of a calibrated altitude correction knob 13 and that is in series with the air speed condenser 10 in the circuit of the beat frequency oscillator 9. The calibrations of the dials 11 and 13 are such as to correspond with air speed and elevation indications, respectively, on usual instruments providing these readings.

The effects of wind upon an aeroplane that is equipped with the instrument that is disclosed herein is provided for by suitable auxiliary tunable condensers 14 and 15 that are connected in series with each other and in parallel with the air speed and the altitude correction condensers 10 and 12 in the tank circuit of the electron tube oscillator 9. The condenser 14 is variably adjusted for wind velocity by operation of a suitably calibrated knob 16. The wind velocity knob 16 preferably is adjusted to the known wind velocity obtained from dependable weather data. The resultant setting of the condenser 14 introduces an air speed correction factor into the oscillator 9 such that the reading indicated by the hair line 5 of the needle 4 will more nearly approach true ground distances.

The tunable condenser 15 preferably comprises two sets of variable capacitor plates that are separately tuned with respect to each other by the operation of separate knobs 17 and 18. The knob 17 is calibrated to read in wind directions and the knob 18 is calibrated in true course directions to be set to the true course from place of departure to destination that is being followed by the aeroplane in which the instrument that is contemplated hereby is installed. The adjustments of the dials 17 and 18 modify the wind velocity adjustment of the dial 16, the condensers 14 and 15 being in series, so that, without further movement of the dial 16, the on-course component of the wind is the only correction that is effectuated by the above described adjustments of the dials 16, 17 and 18 to the indication that is made by the hair line 5 of the pointer 4 on the mileage scales 1 and 2.

The settings of the knobs 11, 13, 16, 17, and 18 respectively establish the proper "crab angle" of the aeroplane in which the present device is mounted. The term "crab angle," as used herein, is defined as any angle through which an aeroplane is turned into the wind in an attempt to correct for drift. A switch arm 19 preferably is disposed between the motor 6 and the electron tube oscillator 9 and can be closed at the start of a trip.

It is recognized that inaccuracies in use will occur from faulty weather data, changing weather conditions, inaccuracies of instruments, personnel factors, and the like. A correction feature is provided for these sources of inaccuracies which provides a quickly adjusted overall correction when the aeroplane in which the present device is installed passes over a known check point, such as a geographical land marker, a radio beam interception, or the like.

The position of the hair line 5 part of the mileage indicating needle 4 relative to the scales 1 and 2 is corrected in any suitable manner and preferably by the operation of a correction knob 20. The knob 20 has a pinion gear 21 mounted on its shaft, that is indicated by a broken line 22. The pinion gear 21 engages peripheral teeth on a gear 23 that meshes with the peripheral teeth on another gear 24, which is part of the differential 8. The differential 8 works on a principle similar to the type that is commonly found in the rear part of the gear train in automobiles and permits the adjustment of the hair line 5 part of the mileage dial needle 4 to the correct mileage reading of the known check mark by operation of the correction knob 20 without operation through the reduction gear box 7 of the rotor in the motor 6. The correction is made at the moment of coincidence of the plane in which the present device is mounted with the known check mark.

The error so noted indicates that a correction must be applied to the speed of the motor 6 by causing a change in the frequency of the electron tube oscillator 9 in order that the present instrument may indicate the true mileage on the scales 1 and 2 from that point onward. This correction is made by operation of a special condenser 25 that comprises two sets of plates 25A and 25B, both of which preferably are independently movable. One set of plates 25A of the condenser 25 is moved by operation of the knob 20 in the adjustment of the hair line 5 of the mileage dial needle 4 with respect to the mileage scales 1 and 2. This correction requires further adjustment of the frequency of the electron tube oscillator 9 in order to divide the correction by the total elapsed mileage.

This further adjustment is accomplished by the setting of the other set of plates 25B of the condenser 25 by suitable means, such as by moving an auxiliary index 26, that is connected to the second mentioned set of plates 25B of the condenser 25, by suitable mechanical means, indicated by a broken line 27, of which the gears 32 and 33 in Fig. 2 are parts, into coincidence with the hair line 5 of the mileage dial needle 4. The auxiliary index 26 may be provided with a hand grip 28, as shown in Fig. 2, if desired. This adjustment introduces the other necessary correction into the frequency of the oscillator 9.

An auxiliary adjustable condenser 30 is connected in series with the condenser 25 in the circuit of the oscillator 9 and serves the purpose of introducing proportional effects on the condenser 25 to adjust the air speed indication of the aeroplane in which the present device is mounted. The adjustable plates of the condenser 30 are moved by operation of a knob 31 that is calibrated in terms of air speed and that is preset to correspond with the air speed knob 11. The condensers 10 and 30, that are operated by the knobs 11 and 31, respectively, may be ganged together to operate from a single knob, not shown, if desired.

An axial section of an illustrative assembly for the mileage dial that forms a part of the device that is shown in Fig. 1 is shown in Fig. 2 of the accompanying drawings. In the construction there shown, the scale 1 extends along the peripheral edge of a bossed plate 35. The plate 35 is non-rotatably mounted upon a panel 36 which is part of the aeroplane in which the present device is mounted in any desired manner and preferably by means of a nut 37 that turns on the threaded lower end of the stepped stem of the plate 35 with a lock washer 38 interposed between the panel 36 and the nut 37.

The ground mileage indicating needle 4 extends radially of the plate 35 and its inner end is secured to a shaft 40, that is journalled to rotate freely centrally of the hub or stem of the plate 35, in any desired way, as by means of a set screw 41, or the like. The shaft 40 connects the ground mileage needle with the differential 8.

The scale 2 is disposed adjacent the scale 1 and along the inner edge of a ring 42. The ring 42 preferably is rabbeted to overlap the matingly rabbeted peripheral edge of the plate 35 and is secured by the screws 44 to the ring plate 43. The lock screw 3 threads through the ring 42 and its radially inner end preferably engages a loose slug 45 that is movably pocketed between the plate 35 and the ring 42 and that minimizes indentations on the outer edge of the plate 35.

The auxiliary index 26 preferably has its inner end secured to the gear 32 by screws 46. The gear 32 is journaled for free rotation on the hub or stem of the bossed plate 35 and preferably is spaced from the panel 36 in any desired manner, as by the space flange part of the gear 32 that is interposed therebetween, or the like. The gear 33, that is meshed with the gear 32, is secured to its shaft 50 by a set screw 47. The shaft 50 preferably carries a collar 48 thereon beneath the panel 36. The collar 48 is locked to the shaft 50 by a set screw 49. The gears 32 and 33 and the shaft 50 comprise the mechanical means 27 in Fig. 1 of the drawing. The time dial assembly that is shown in Fig. 2 of the accompanying drawings is illustrative of a suitably operative device therefor and may be modified as desired.

It is to be understood that the circuit, its components and the mechanical devices associated therewith in the accompanying drawings have been submitted for the purposes of illustrating and describing an embodiment of the present invention and that similarly functioning modifications, changes and substitutions may be made therein without departing from the present invention as defined by the appended claims.

What I claim is:

1. A navigation data integrating device for providing a moving craft with a continuous indication as to distances from point of departure and to point of destination, including two juxtaposed scales calibrated respectively in distance from point of departure and distance to point of destination, said scales being inversely correlated and longitudinally adjustable relative to each other, a mileage indicating needle movable along both of said scales simultaneously, a synchronous motor coupled to the mileage indicating needle to move the same along the said scales, a beat frequency oscillator coupled to the motor to control the operating speed of said motor according to the frequency of said oscillator so as to control the rate of movement of the said needle along said scales, said oscillator incorporating frequency adjusting means, said means being adjustable to vary the frequency of said oscillator and to thereby vary the rate of movement of the needle in accordance with factors affecting the ground speed made good of the craft.

2. A navigation data integrating device as defined in claim 1, wherein the frequency adjusting means includes two condensers connected in series, one of which condensers may be varied in accordance with the indicated air speed of the craft and the other of which condensers may be varied in accordance with the altitude of the craft.

3. A navigation data integrating device as defined in claim 1, wherein the frequency adjusting means includes two condensers connected in series, one of which condensers may be varied in accordance with the wind velocity and the other of which condensers includes two capacitive elements separately tunable with respect to each other and which elements may be varied respectively in accordance with the wind direction and in accordance with the true compass heading to be made good by the craft, whereby the frequency of the oscillator may be varied only in accordance with the on-course component of the wind.

4. A navigation data integrating device as defined in claim 1 which includes a differential interposed between the motor and the needle to allow the needle to be moved for correction purposes without interfering with the operation of the motor, and an auxiliary index which may be moved along said scales, and wherein the frequency adjusting means aforementioned includes two condensers connected in series, one of which condensers may be varied in accordance with the indicated air speed of the craft and the other of which condensers includes two capacitive elements separately tunable with respect to each other, one of which elements is coupled to the movable index and is adjusted upon movements thereof and the other of which elements is coupled to the differential aforesaid and is adjusted upon movements of the needle for correction purposes.

5. A navigation data integrating device as defined in claim 1, which includes a differential interposed between the motor and the needle to allow the needle to be moved for correction purposes without interfering with the operation of the motor; and an auxiliary index which may be moved along said scales; and wherein the frequency adjusting means include three sets of condensers connected in parallel with each other, one of which sets includes two condensers connected in series, one of which condensers may be varied in accordance with the indicated air speed of the craft and the other of which condensers may be varied with the altitude of the craft, and another of which sets includes two condensers connected in series, one of which last mentioned condensers may be varied in accordance with the wind velocity and the other of which last mentioned condensers includes two capacitive elements separately tunable with respect to each other and which elements may be varied respectively in accordance with the wind direction and the compass heading to be made good by the craft, and another of which sets includes two condensers connected in series, one of which last mentioned condensers may be varied in accordance with the indicated air speed of the craft and the other of which last mentioned condensers includes two capacitive elements separately tunable with respect to each other, one of which last mentioned elements is coupled to the movable index and is adjusted upon movements thereof and the other of which elements is coupled to the differential aforesaid and is adjusted upon movements for correction purposes of the needle.

6. A navigation data integrating device as defined in claim 1, which includes overall correction means, which last named means includes both means to move the needle along the scales to correct its position at any time during the operation of the device and means to automatically compute the degree of error which caused the incorrect position of the needle and to apply a suitable degree of correction to the speed of the motor to eliminate said error.

7. A navigation data integrating device as defined in claim 1, which includes a differential interposed between the motor and the needle to allow the needle to be moved, for correction purposes, without inerfering with the operation of the motor; and an auxiliary index which may be moved along said scales; and wherein the frequency adjusting means include two sets of condensers connected in parallel with each other, one of which sets includes first and second condensers connected in series, the first condenser being variable in accordance with the indicated air speed of the craft and the second condenser being variable in accordance with the altitude of the craft, and the other of which sets includes third and fourth condensers connected in series, the third condenser being variable in accordance with the indicated air speed of the craft and the fourth condenser including two capacitive elements separately tunable with respect to each other, one of said last mentioned elements being coupled to the movable index and being adjustable upon movements thereof and the other of said elements being coupled to the differential aforesaid and being adjustable upon movements, for correction purposes, of the needle, the first and third condensers being ganged for simultaneous operation, and the four condensers being of such values that, upon movement of the needle from an incorrect to a correct position along the scales and a movement of the auxiliary index to compensate for said corrective movement of the needle, the fourth condenser is automatically adjusted to introduce a proper proportional effect to compensate for inaccuracy in the indicated air speed of the craft.

8. In a navigation data integrating device, a dial, including a stationary circular scale calibrated in units of distance, a second circular scale calibrated in units of distance inversely correlative to the first scale and concentric therewith and movable relative thereto, a radially disposed needle movable relative to both of said scales, a shaft extending through the axis of the scales and rotatable with said needle, a radially disposed auxiliary index movable relative to said scales, a rotatable gear coaxial with the scales and rotatable with the auxiliary index, a second gear cooperating with said first gear and a condenser which has two capacitive elements separately tunable with respect to each other, one of which elements is coupled to the shaft and the other of which elements is coupled to the second gear.

9. In a navigation data integrating device, a panel, a peripherally calibrated circular plate rigidly secured to and parallel to said panel, a ring coaxial with said circular plate and mounted upon said plate for rotation about the periphery of said plate and calibrated adjacent the calibrations on the plate, means to lock the ring against rotation relative to the plate, a rotatable shaft extending through the plate and the panel and coaxial with said plate, a radially disposed indicating needle secured to said shaft, a hairline means secured to said needle and movable along the calibrations on both the plate and the ring, a radially disposed auxiliary index sustained by the plate and rotatable about its axis and provided with a pointing means proximate to the calibrations on both the plate and the ring, means to rotate the needle, and means to rotate the auxiliary index.

HARRY WILKIE.

REFERENCES CITED

The following references are of record in the file of this patent:

UNITED STATES PATENTS

| Number | Name | Date |
| --- | --- | --- |
| 268,045 | See | Nov. 28, 1882 |
| 1,948,946 | Smith | Feb. 27, 1934 |
| 2,116,508 | Colvin | May 10, 1938 |
| 2,117,587 | Young | May 17, 1938 |
| 2,150,572 | Young | Mar. 14, 1939 |
| 2,200,130 | Lewis et al. | May 7, 1940 |
| 2,377,011 | Huenergardt | May 29, 1945 |

FOREIGN PATENTS

| Number | Country | Date |
| --- | --- | --- |
| 194,330 | Great Britain | Mar. 15, 1923 |